April 9, 1929.   E. PIQUEREZ   1,707,993

AUTOMATIC CHARGE LIMITING DEVICE FOR LUBRICATION

Filed April 16, 1925

Inventor
Emile Piquerez,
By Pierce & Luret
Attys.

Patented Apr. 9, 1929.

1,707,993

UNITED STATES PATENT OFFICE.

EMILE PIQUEREZ, OF PARIS, FRANCE, ASSIGNOR TO ALEMITE MANUFACTURING CORPORATION, OF CHICAGO, ILLINOIS, A CORPORATION OF DELAWARE.

AUTOMATIC CHARGE-LIMITING DEVICE FOR LUBRICATION.

Application filed April 16, 1925, Serial No. 23,743, and in France October 27, 1924.

The invention relates to forced lubrication, and more specifically to means for automatically limiting the amount of lubricant delivered to a given part at one time. It is preferably embodied in a fitting particularly designed to accomplish such automatic limitation, so as to assure a reasonable limitation on the lubrication of the parts upon which it is mounted.

The use of such a fitting is especially desirable in cases where an excess of lubricant might produce undesirable results, for instance in the lubrication of brakes, but, in general, it will always accomplish two essential functions: first, regularity of lubrication, and second, economy of lubricant.

The fitting is particularly designed to receive lubricant from devices delivering a continuous supply of lubricant under high pressure. Various types of grease guns for this purpose are well known.

The device comprises primarily a cup threaded into the member to be lubricated, inside of which is a piston which measures, when it is at the end of its stroke between its upper face and a valve cap closing cup, a predetermined volume of lubricant received from the supply pump. The piston subsequently moves back, under the action of a spring, to its initial position, while by-passing the lubricant below its lower face, and it is this by-passed lubricant which will be delivered next into the parts to be lubricated upon the next filling operation by the pump. A cylindrical prolongation on the cap valve makes it possible to reduce the interior pressure upon disconnection so as to facilitate such disconnection and eliminate leakage of lubricant.

Figure 1:
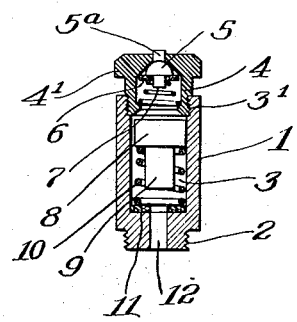
Fig. 1 is a longitudinal section of one embodiment of the invention.

In the embodiment selected for illustration in Fig. 1, the device comprises a cup 1, preferably cylindrical, provided with a threaded foot 2 for mounting it on the part to be lubricated, and threaded at the upper end of the bore 3, as at 3', to receive a cap 4 provided with a suitable valve 5 sealed by a packing 6 held in place by a spring 7 resting against an interior shoulder in the cap 4. The head 4 is preferably hexagonal for convenience in assembly.

A main piston body 8 slides in the cup 1, being of slightly smaller diameter than the chamber 3 (several tenths of a millimeter at least), and having a cylindrical extension 9 encircled by a coil spring 10 bearing against the head 8 and on a packing 11 at the bottom of the chamber 3 which opens through the conduit 12 to the parts to be lubricated.

The valve 5 carries a cylindrical extension 5ª to operate as a piston in the corresponding axial passage in the head 4, for a purpose which will be explained later.

The operation is as follows:

The space below the head 8 of the piston being full of lubricant, and the pump being connected up to the head 4, the pump means is operated to deliver a continuous supply of lubricant. This pushes down the valve 5, enters into the cup and pushes down the piston 8 by pressure exerted on its upper face. The piston 8 in its descent pushes out through the conduit 12 the lubricant which was below it, and thus while the upper part of the chamber 3 is filled, the lower part is emptied. When the extension 9 covers the conduit 12, flow is cut off, the operator disconnects the pump, and the valve 5 closes immediately, the extension 5ª operating as a piston and relieving the internal pressure so as to facilitate uncoupling and avoid leakage of lubricant. The spring 10, which has been compressed, now extends gradually and the piston 8 compresses the lubricant above it, forcing it to leak around the clearance between the piston and the bore 3 and to pass to the underside of the piston. After the piston 8 has returned to the initial position of Fig. 1, the device is ready for a second operation.

It will be apparent that at each lubricating operation, the quantity injected into the parts is exactly equal to the volume of a cylinder having a section equal to that of the chamber 3 and a length equal to the displacement of the piston 8 and compression of the spring 10, which dimensions are predetermined in constructing the device.

Figure 2:
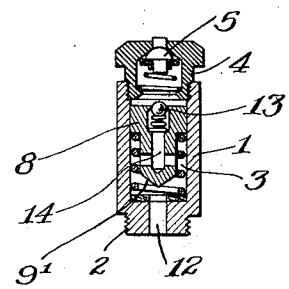
Fig. 2 is a longitudinal section of a second embodiment.

In the embodiment of Fig. 2, the piston 8 is provided with a central valve 13, such as a ball valve, limiting the entry of lubricant into the conduit 14 which communicates with chamber 3. The piston stem 9 terminates in a conical end 9' to assure a tight closure of the conduit 12.

The first part of the operation is precisely the same as in Fig. 1. When the pump has been disconnected and the valve 5 has been closed, the spring 10 elongates, and the piston, in rising, compresses the lubricant to force the ball valve 13 open and pass the lubricant to the bottom of the piston through the conduit 14. When the piston has come back to its initial position, the valve 13 will close and the device is ready for a second operation.

Figure 3:
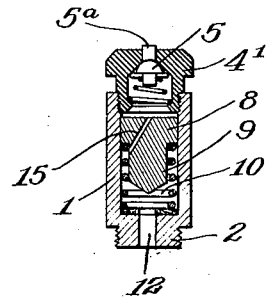
Fig. 3 is a longitudinal section of a third embodiment.

In the embodiment of Fig. 3, the piston 8 has the same exterior form as before, but it is provided merely with a simple inclined conduit 15 of very small diameter, interconnecting the two parts of the chamber 3. This conduit performs the same function as the clearance between the piston and the walls of the chamber 3 in Fig. 1, and with that exception the operation is identical.

Without further elaboration, the foregoing will so fully explain the gist of the invention, that others may, by applying current knowledge, readily adapt the same for use under various conditions of service without eliminating certain features which may properly be said to constitute the essential items of novelty involved, which items are intended to be defined and secured by the following claims.

I claim:

1. A lubricant fitting comprising a barrel having an intake port at one end and a discharge port at the other, a check valve in said intake port, said check valve having lost motion after closing its port to relieve pressure stored in said fitting beyond the same without external leakage, a piston in said barrel normally remote from said discharge port but movable by flow through said fitting to close said discharge port and stop the flow, resilient means urging said piston from stop position back to normal, and means permitting a slow leakage past said piston to enable said resilient means to return the piston.

2. A lubricant fitting comprising a barrel having an intake port at one end and a discharge port at the other, a check valve in said intake port, said check valve having lost motion after closing its port to relieve pressure stored in said fitting beyond the same without external leakage, and a piston movable relatively to said valve.

3. A lubricant fitting comprising a barrel having an intake port and a discharge port, an inwardly opening check valve in said intake port, a piston in said barrel normally remote from said discharge port but movable by flow through said fitting to close said discharge port and stop the flow, resilient means urging said piston from stop position back to normal, a bleed passage way through said piston, and a spring pressed outwardly opening check valve in said passage way.

4. In a lubricating system including a lubricant pump provided with a quick detachable coupler for effecting a sealed connection with a plurality of lubricant receiving fittings in succession, a fitting comprising a body member having means at one end thereof for securing said member to a part to be lubricated, coupling means for forming an interlocking connection with the coupler of the lubricant pump, a sealing surface at the other end of said body adapted to form a lubricant-tight seal with said coupler, and metering means in said body to determine the quantity of lubricant supplied to the bearing.

5. In lubricating apparatus of the class described, a lubricant pump, a coupler connected to said pump and adapted to effect a sealed connection with a plurality of lubricant receiving fittings in succession, and a lubricant receiving fitting comprising a body member having an end adapted to be secured to a part to be lubricated, a second end adapted to form a sealed connection with said coupler, and a passageway through the body, and measuring means comprising inwardly and outwardly opening check valves located in said passageway and movable relatively to each other.

6. A lubricant fitting comprising a barrel having an intake port and a discharge port, a piston in said barrel normally remote from said discharge port but movable by flow through said fitting to close said discharge port and stop the flow, resilient means urging said piston from stop position back to normal, a bleed passageway through said piston, and a spring pressed check valve in said passageway, said check valve opening under a lower hydraulic pressure than that generated by said resilient means.

In witness whereof, I hereunto subscribe my name, this 23rd day of March, 1925.

EMILE PIQUEREZ.